D. A. MERIDETH.
ADJUSTABLE VEHICLE SEAT.
APPLICATION FILED DEC. 22, 1920.
1,375,058.
Patented Apr. 19, 1921.
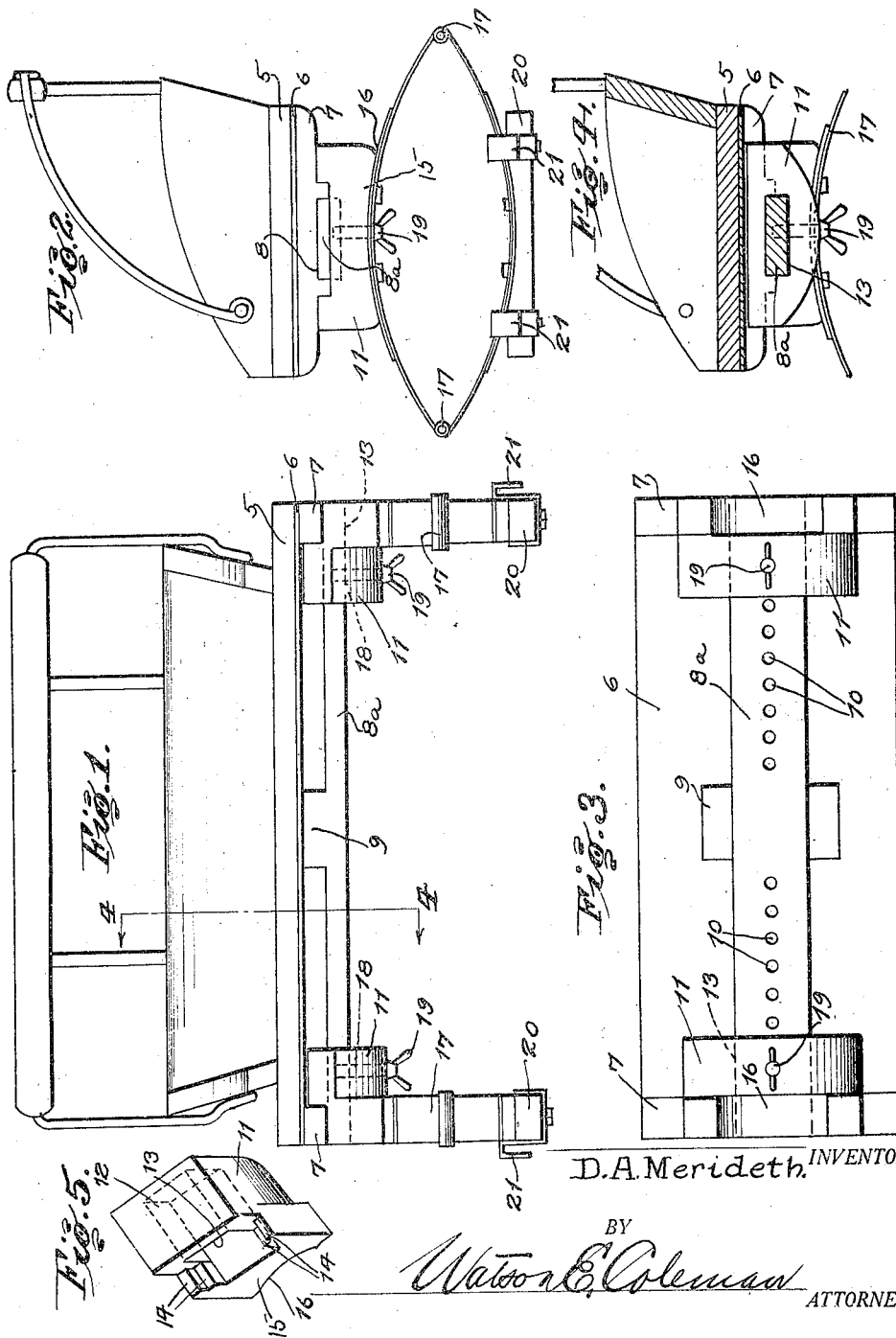
D. A. Merideth. INVENTOR.
BY Watson E. Coleman ATTORNEY.

UNITED STATES PATENT OFFICE.

DOSS A. MERIDETH, OF PRAGUE, OKLAHOMA.

ADJUSTABLE VEHICLE-SEAT.

1,375,058.   Specification of Letters Patent.   Patented Apr. 19, 1921.

Application filed December 22, 1920. Serial No. 432,546.

*To all whom it may concern:*

Be it known that I, Doss A. MERIDETH, a citizen of the United States, residing at Prague, in the county of Lincoln and State of Oklahoma, have invented certain new and useful Improvements in Adjustable Vehicle-Seats, of which the following is a specification, reference being had to the accompanying drawings.

This invention relates to vehicle seats and particularly to seats for wagons.

An object of the invention is to provide a seat capable of being readily adjusted for use on wagon bodies of various widths.

Another object of the invention is to provide a seat of this character wherein the means for supporting the seat on the wagon body is adjustable to accommodate the seat to wagon bodies of various sizes.

Another object is to provide a wagon seat of this character having a track depending from the lower surface of the seat and extending longitudinally thereof and supporting members slidable on the track, said supporting members being connected to the springs of the seat whereby the spring and means for connecting the seat to the vehicle are movable with the supports.

A still further object of the invention is to provide a wagon seat of this character wherein the adjustable supporting members are permitted to extend beneath the hangers of the track on which they are mounted so as to position the springs at the ends of the seat and thereby permit adjustment from one end of the seat to the other.

With the above and other objects in view, the invention consists in the improved construction and arrangement of parts to be hereinafter more particularly described, fully claimed and illustrated in the accompanying drawings, in which:—

Figure 1 is a front elevation of an adjustable vehicle seat constructed in accordance with an embodiment of the invention, Fig. 2 is an end elevation, Fig. 3 is a bottom plan view, Fig. 4 is a section taken on the line 4—4 of Fig. 1, Fig. 5 is a detail view of one of the supporting members.

Referring to the drawings, 5 designates a conventional form of wagon seat to the lower surface of which a sheet of metal 6 is secured, said sheet coinciding with the bottom of the seat to not only reinforce the same but to facilitate the adjustment of the seat. Depending from each end of the bottom of the seat, is a track hanger 7 having a laterally extending recess 8 formed in its intermediate portion. These hangers are disposed flush with the end of the seat so as not to interfere with the adjustment of the supports of the seat. A mono-rail or track $8^a$ is provided, and has its end portions disposed within the recesses 8 and secured to the hangers. This track extends longitudinally of the seat and is disposed at the intermediate portion thereof. The intermediate portion of the track is provided with an extension 9 which is disposed between the track and the bottom of the seat, and not only braces the intermediate portion of the track by engagement with the seat but serves as a stop to limit adjustment of the supports of the seat. The lower surface of the track is provided with a series of openings 10, the purpose of which will be hereinafter described.

In order to permit adjustment of the seat and at the same time properly support the same, there is provided a pair of supports, each support consisting of a body member 11 having a flat upper surface 12 and an opening 13 extending laterally thereof, said opening corresponding to the form of the track and adapted to receive the same. One end portion of the surface 12 is cut away to provide shoulders 14, the upper surface of said shoulder terminating at the intermediate portion of the opening 13. The end portion 15 of the lower surface of the support, beneath the shoulders 14 is provided with a curved recess 16 for the reception of the springs 17 of the seat. It will be noted that a portion of the support projects beyond the spring and is provided with an opening 18 adapted to receive fastening means 19 by means of which the support is held in its adjusted position. Secured to the lower portion of the spring 17 is a connecting and holding member 20 which is provided with a plurality of hooks 21 adapted to engage the sides of the wagon body.

It will be noted that the track $8^a$ is disposed in spaced parallel relation to the bottom of the seat. This permits the supporting members 11 to surround a portion of the track whereby said members may slide longitudinally of the track toward and away from each other. It will also be noted that the upper surface 12 of the support is disposed closely adjacent and in parallel relation to the bottom of the seat so that in case the vehicle is traveling over rough roads the entire burden or strain of support is not centered on the track and the walls of the end portion 15 as the upper portions 12 of the supports will engage the bottom of the seat and thereby serve as braces, as the supports project a considerable distance on each side of the track. By providing the novel form of brace 9, the track and intermediate portion of the seat is properly supported when the seat is used on a small sized wagon body so that the track does not depend entirely on the hangers for its support. In this way damage is prevented.

In the application of the device, the supports are moved along the track 8ª to the point desired. The fastening means 19 is then passed through the support into one of the openings 10 of the track so as to firmly hold the support in its adjusted position. The seat may then be applied to the wagon in the wellknown manner. The seat may also be applied to wagons which are slightly greater in width to the length of the seat, as the reduced portion of the upper surface 12 of the supports permits said supports to be disposed in alinement with the hangers 7 so that the springs are positioned substantially flush with the ends of the seat so that while the hangers are disposed within the path of movement of the supports, they do not interfere with the adjustment thereof and assist in bracing the supports when said supports are disposed at the ends of the seat.

From the foregoing it will be readily seen that this invention provides a novel form of wagon seat which may be used in connection with any wagon having means with which the hooks 21 may be engaged. An important feature of this adjustable seat is that the condition of the road, or the weight of the person occupying the seat cannot damage the adjustable parts, or the track, as the track is efficiently braced at its ends and its intermediate portion, and the supports are not only braced by the track in view of the fact that it is substantially rectangular, but by contact at certain times with the lower surface of the seat and the hangers. In addition to this the supports may be readily fastened in their adjusting position, as the springs do not interfere with the operation of the fastening means 19 and as the adjustable parts are simple and compact, the adjustment may be made by anyone.

What is claimed is:—

1. A vehicle seat construction comprising a seat, track hangers carried by the bottom of the seat, a track extending longitudinally of the seat and connected to the hangers, supporting means slidable on said track, said means comprising a pair of supporting members adapted to surround a portion of the track, a portion of each supporting member projecting on each side of the track, said projecting portions being adapted to contact at certain times with the bottom of the seat, each of said supporting members having one end portion thereof reduced to provide a shoulder adapted at certain times to be disposed beneath the hangers, springs secured to the lower surface of the supporting members, and means for connecting the springs to the body of the vehicle.

2. An adjustable vehicle seat comprising a seat, track hangers depending from the bottom of the seat, a track connected to said hangers, and extending longitudinally of the seat, supporting members slidable on said tracks in alinement with each other, each supporting member having the upper surface of one of its end portions reduced for the reception of the track hangers when the supporting members are disposed at the limit of their movement, means carried by the lower surface of the reduced end portion of each supporting member for connecting the seat to a vehicle, and fastening means disposed in the lower surface of the opposite end portion of each supporting member and adapted to engage the track.

In testimony whereof I hereunto affix my signature.

DOSS A. MERIDETH.